May 16, 1933.  L. S. WILLIAMS  1,908,805
GENERATOR AND BRUSH HOLDER
Filed June 30, 1931
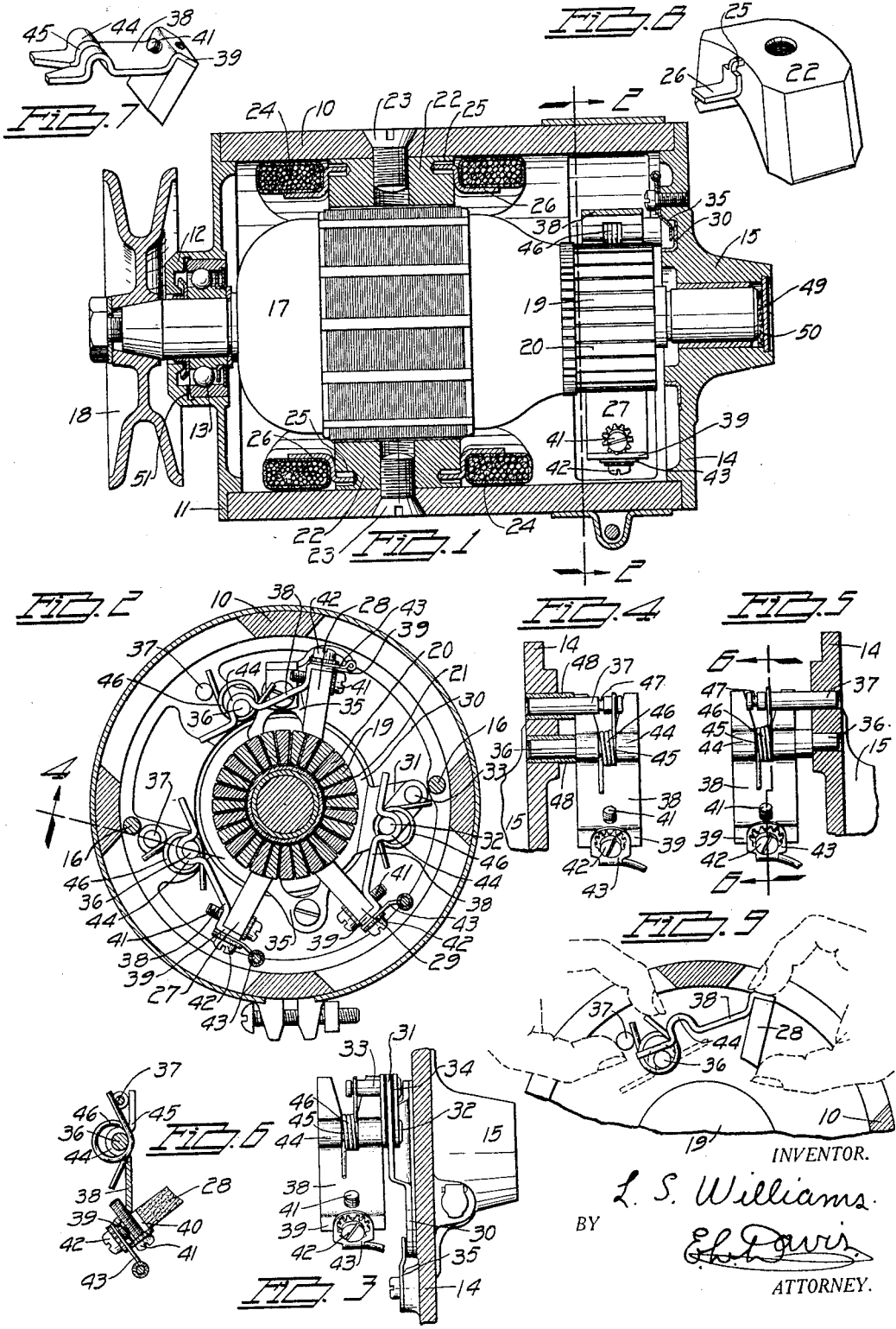
INVENTOR.
L. S. Williams.
BY
E. L. Davis.
ATTORNEY.

Patented May 16, 1933

1,908,805

UNITED STATES PATENT OFFICE

LEONARD S. WILLIAMS, OF DETROIT, MICHIGAN, ASSIGNOR TO FORD MOTOR COMPANY, OF DEARBORN, MICHIGAN, A CORPORATION OF DELAWARE

GENERATOR AND BRUSH HOLDER

Application filed June 30, 1931. Serial No. 547,921.

One object of my invention is to provide a motor or generator brush holder of simple, durable and inexpensive construction. My improved brush holder is believed to incorporate novel features both in its simplicity of construction and in that it more rigidly secures the brush in position thereby preventing vibration from the commutator which is frequently the cause of such brushes humming.

It is well known that direct current generators and motors employ commutators for rectifying the current generated, which commutators are usually constructed as an annulus of segments each alternated with sheets of mica. It has been found impractical to machine the periphery of such segments and mica sheets as a smooth arcuate surface for the reason that the mica does not wear as fast as the segments and must be under-cut below the edges of the segments. If such undercutting were not provided and the whole commutator was simply turned to a smooth surface, then after a short period of operation the segments would wear to a greater extent than the mica thereby causing the brushes to ride on the top of the mica sheets and make poor contact with the segments.

The undercutting of the insulation of automobile generator commutators is the cause of brush humming and is objectionable. In order to overcome the noise or hum set up by the vibration of such brushes an extremely rigid brush holder must be provided to reduce the vibration to an inaudible extent. I have provided such a brush holder which in tests has proven to be superior to the ordinary brush holder usually associated with such devices in that it rigidly supports its brush and prevents humming thereof.

Perhaps the most important feature of my improved brush holder and one wherein it materially differs from all existing brush holders with which the applicant is familiar, is that the holder and brush may be removed and replaced without disassembling the generator. Heretofore, when it was desired to replace a brush the generator head was required to be removed and the brush and holder disengaged therefrom. With my improved device, the brush and holder may be removed from the generator without disturbing the head and other brushes and without special tools so that the replacement is a very quick and inexpensive operation.

Still a further object of my invention is to provide a brush holder which will be exceptionally cheap to manufacture. In this connection it may be well to mention that my brush holder is formed from a single strip of sheet metal, stamped to the desired shape by means of only a single forming operation on the blank.

Still a further object of my invention is to provide a brush holder which may be used interchangeably for supporting all of the brushes on the generator, there being no right or left hand limitations which limit the brush holder to installation in one position only. In this connection, it may be well to mention that the supporting pins for my brush holder are so constructed that even identical brush holder springs may be used for all of the brushes to thereby simplify both the manufacture and servicing of the generator.

Still a further object of my invention is to provide a brush holder which for a given size will provide an increased bearing surface on the supporting pins, whereby even in the absence of lubrication, the brush holder will normally out-last the generator or vehicle on which it is used. The ordinary brush holder is provided with openings punched or drilled in each side thereof through which openings a pin is inserted to pivotally mount the holder. These openings become enlarged because of wear thereby causing misalignment of the brush holder. The excessive wear of these pivots is due primarily for the reason that it is impractical to oil these bearing surfaces because of the danger of the oil creeping into contact with the brushes which, as it is well known, causes the brushes to crumble and fail. With my improved brush holder, a bearing surface extending substantially the full width of the holder is provided which surface will out-last the ordinary generator.

With these and other objects in view, my invention consists in the arrangement, construction and combination of the various parts of my improved device, as described in the specification, claimed in my claims and illustrated in the accompanying drawing, in which:

Figure 1 is a central sectional view through my generator, the armature being shown in full to better illustrate the construction.

Figure 2 shows a cross sectional view, taken on the line 2—2 of Figure 1.

Figure 3 shows a side view of my third brush holder and mounting ring.

Figure 4 shows a sectional view of one main brush support, taken on the line 4—4 of Figure 2.

Figure 5 shows a similar view of the opposite brush, illustrating the means whereby the brushes, retaining springs and supporting pins are rendered interchangeable.

Figure 6 shows a sectional view, taken on the line 6—6 of Figure 5.

Figure 7 shows a perspective view of my brush holder and brush, illustrating its simplicity of construction.

Figure 8 shows a perspective view of one of my field coil retaining clips in position in a pole piece, and Figure 9 is a diagrammatic view illustrating the simple operations required to remove the brush holder from the generator without removing the generator head.

Referring to the accompanying drawing, I have used the reference numeral 10 to indicate the field ring of any ordinary automobile generator unit, the forward end of which is provided with a cover 11 that is preferably formed as a stamping with the center portion having a bearing retaining depression 12 therein into which a ball bearing unit 13 is secured. To the opposite end of the ring 10 is secured a combined generator head and brush supporting member 14, preferably formed as a casting, the center portion of which is provided with a boss 15 which forms the rear bearing for the generator armature. These two cover members are secured to the ring 10 by means of a pair of tie bolts 16 which extend through the generator within the field ring.

Rotatably mounted between the bearings 12 and 15, is a generator armature 17, the forward end of which projects forwardly from the cover plate 11 where a pulley 18 is secured thereto by means of which the armature may be rotated in the conventional manner. This armature is provided with a commutator 19 which consists of an annulus of commutator segments 20 each of which are separated from each other by a sheet of mica insulation 21 and each of which are connected to the several armature coil windings in the usual manner. The outer edges of the insulation 21 are under-cut below the segments 20 so that suitable brushes may adequately contact with the commutator.

The generator shown is provided with two equally spaced pole pieces 22 projecting inwardly from the intermediate portion of the ring 10 and secured thereto by means of screws 23. Around each of these pole pieces a field coil 24 is provided which is rigidly secured in position in order that it may not accidentally come in contact with the rotating armature. In order to secure such coils in place I have provided a simple but very effective clip mechanism which is exceptionally cheap to manufacture, easy to assemble, and very reliable in its operation. Each of the pole pieces 22 are provided with a pair of opposed openings 25 drilled therein in their forward and rear faces and one arm of a Z shaped clip 26 which is formed as a lug is adapted to enter each opening while the other end is shaped to bear against the center portion of the adjacent field coil 24.

The above described structure is illustrated in Figures 1 and 8 where it will be seen that once the clips are installed in position the field coils are adequately prevented from coming in contact with the armature. It will be further noted that no bolts, screws or the like are required for this assembly and that the clips are very inexpensive to manufacture.

It will also be noted from Figure 1, that the outer end of the bearing 15 is closed with a "Welch plug" 49 and a fibre disc 50 is interposed between the plug and the adjacent end of the armature shaft to absorb the end thrust in one direction of the armature. The end thrust in the other direction is taken against a shoulder 51 formed in the bearing depression 12 against which the outer race of the bearing 13 co-acts. Considerable play is provided between these stops; however, this clearance is somewhat exaggerated in the drawing.

A feature of great importance in connection with this device is the novel method whereby I support the brushes which co-act with the commutator 19. Automobile generators are usually of the third brush regulating type, that is, two main brushes are provided which bear against the commutator and pick-up the current generated in the armature coils and a third brush is provided which is circumferentially adjustable in relation to the other brushes which pick-up current for energizing the field coils of the generator. The amount of current picked-up by the third brush is proportional to its position on either side of a neutral position, whereby the output of the generator can be regulated. The two main brushes of my generator have been designated by numerals 27 and 28, respectively, and it will be seen that these brushes are secured in fixed positions relative to each other on the head 14. The third brush, which I have designated by numeral 29, is however, mounted upon the head member so as to be moved circumferentially around the commutator relative to the other brushes. This mounting consists of a ring 30 which is rotatably mounted on the inside of the cover member 14 in alignment with the boss 15, which ring is provided with a bracket 31 extending from one side thereof and to which a pair of pins 32 and 33, respectively, are secured so as to project over the commutator. These pins are insulated from the bracket 31 by insulation 34 whereby the third brush 29 mounted upon these pins will likewise be insulated from the bracket and the generator body. A pair of spring clips 35 are secured to the inside face of the cover 14 and bear against diametrically opposite points on the ring 30 so that the adjustment of the third brush will remain in a predetermined position, although it may be shifted circumferentially by tangential pressure applied to the bracket 31.

Each of the brushes 27 and 28, are secured to a pair of my improved brush holders, the latter being mounted upon pairs of pins 36 and 37 which extend inwardly from the head 14. The pair of pins which support the brush 27 are pressed into insulation bushings 48 which are secured in the cover member so that these pins extend inwardly over the commutator but still insulate the pins from the cover member. The pair of pins supporting the brush 28 are pressed directly into the cover member, inasmuch as this brush is desired to be grounded to the housing. Thus, the three brushes are supported from the generator head each by means of pairs of pins extending inwardly therefrom.

My brush holder, which is believed to be new, consists of a strip of sheet metal 38 having one end bent to a V shape, as at 39, whereby the back portion of the brush may be secured in this V. Each brush is provided with a slot 40 and a screw 41 is threaded into the V portion which screw extends through the slot 40 so that the brush is rigidly secured in position. A second screw 42 is threaded in the other arm of the V portion which secures a terminal 43 in electrical connection with the brush holder. The advantages of this structure is that the brush may be assembled to the holder in correct position and the terminal later secured thereto without disturbing the brush so that when the brush is once secured to the holder in the correct position, it need not be disturbed when connecting a terminal 43 after the device is installed in the generator.

The intermediate portion of the strip 38 is bent to a U shape, as at 44. A lengthwise extending central slot 45 is stamped in the end of the strip opposite the brush which slot extends through the U shaped portion 44 to form in effect a pair of arms between which a spring 46 is mounted. It will be noted from the drawing that the U shaped portion 44 is simply laid down over one of the pins 36 so that the spring 46 will resiliently hold it in contact with the pin. The remaining pin 37 of each pair is provided to form an anchor for the opposite end of the spring 46 so that the spring will both resiliently urge the brush into contact with the commutator and at the same time resiliently urge the U portion into contact with the pin 36.

It will be noted from Figures 4 and 5 that each of the pins 37 are provided with a pair of annular grooves 47. When it is desired to assemble the brush as shown in Figure 4, that is, in a manner similar to the brush 27, the brush holder is inserted over the pin 36, the spring 46 being in position, and one arm of the spring will then enter the outer groove 47. When it is desired to assemble the brush, as shown in Figure 5, this being the position in which the brush 28 is mounted, it will be seen that the anchored end of the spring 46 then engages the inner groove 47. This construction allows the use of a single type of brush holder spring and pin for both the brushes 27 and 28.

Perhaps the most important feature in connection with this device is the simplicity by which the brush holder may be assembled into the generator. It is well known that occassionally one brush will fail, sometimes due to accidentally having a drop of oil splashed thereon and shortly thereafter the brush will be useless while the other brushes of the generator will remain almost like new. In this case it is essential to replace the useless brush and it is a feature of this invention that the brush holder may be replaced without removing the head member 14 so as not to disturb the other brushes in the head member. It will readily be seen that, if the head member is removed, the three brushes will immediately snap down into position, as shown in Figure 6, wherein the outer ends of the brush holders contact with the anchor pin 37 and that, in order to reassemble the head, the three brushes must be simultaneously held in their tensioned positions. This is an operation requiring experience and knack and is one that the ordinary owner of the car is entirely incapable of performing. My improved brush holders may be removed from their retaining pins without disturbing the head member 14 and therefore without disturbing either of the other brushes so that its replacement can be accomplished very easily and by the ordinary owner of the vehicle.

In order to so remove this brush holder the two ends of the spring 46 are squeezed together between the fingers, as shown in Figure 9, or with a pair of pliers, thereby relieving the spring tension upon the U portion of the brush holder. The holder may simply be raised up from its pin 36 and withdrawn from around the spring. A new brush assembly may then be simply inserted and the spring released and it is automatically secured in the correct position. It will be noted that the brush holder is not inserted over the ends of the pin 36 which if required would make the device inoperative for an automobile generator as a space between the head and the field coils is insufficient to so assemble or disassemble the holder in this manner.

Among the many advantages arising from the use of my improved device it may be well to mention that I have provided a generator having a novel clip for retaining the field coils therein, which clips are inexpensive to manufacture and easy to assemble, but still positively hold the coils in position so that no interference between the coils and the rotating armature is possible.

Still a further advantage results in that I have provided an improved brush holder which may be interchangeably used in all of the three brushes in the generator and which brush holder will be exceptionally cheap to manufacture, being formed from a single strip of sheet metal, blanked in one operation and pressed to its finished form by a single forming operation. In this connection it will be noted that my brush holder has no ears extending from either side thereof so that the strip stock need be no wider than the brush holder proper whereby the stock loss through forming is negligible.

Still a further advantage results with my improved brush holder in that the bearing surface provided extends practically the full width of the brush holder, being many times greater than the bearing surface ordinarily provided in such brush holders so that, even though the brush holder is never lubricated, still it will out-live the vehicle upon which the generator is used.

A further and possibly most important feature of my improved brush holder for use in connection with automobile generators and starting motors is that any of the brush holders may be removed without disturbing the other brushes or head member so that the servicing of this generator is a very simple and easy operation, to thus distinguish it from all other brush holders of which the applicant has knowledge.

Some changes may be made in the arrangement, construction and combination of the various parts of my improved generator without departing from the spirit of my invention and it is my intention to cover by my claims such changes as may reasonably be included within the scope thereof.

I claim as my invention:

1. In a brush holder of the class described, a supporting member, a strip of material having a brush secured to one end thereof, said strip having a transverse U-shaped bearing thereon adjacent to its other end adapted to laterally fit down over said supporting member, a fixed anchor laterally spaced from said supporting member, and a spring disposed around said supporting member having its end bearing respectively against said fixed anchor and a portion of said strip spaced from said U-shaped bearing whereby said brush will be resiliently urged to its operative position and whereby upon deflecting the adjacent end of said spring away from said strip, said strip and brush may be withdrawn laterally from said supporting member.

2. A device, as claimed in claim 1, wherein said strip is formed of sheet metal.

3. A device, as claimed in claim 1, wherein said supporting member and fixed anchor comprise a pair of laterally spaced pins.

4. A device, as claimed in claim 1, wherein the ends of said spring are normally in position to be gripped between the thumb and finger to deflect said spring away from the brush member.

5. A device, as claimed in claim 1, wherein said U-shaped bearing comprises a depression stamped in said strip.

6. In a brush holder of the class described, a supporting member, a strip of material having a brush secured to one end thereof, said strip having a transverse U-shaped bearing therein adjacent to its other end adapted to fit down over said supporting member and having a longitudinal slot extending from said other end through said U-shaped bearing, a fixed anchor, a coil spring disposed around said supporting member and located within said slot having one end thereof bearing against the material of the strip adjacent to the end of said slot and having the other end of said spring anchored against said fixed anchor for the purpose described.

7. A device, as claimed in claim 6, wherein said strip is formed of sheet metal.

8. A device, as claimed in claim 6, wherein said supporting member and fixed anchor comprise a pair of laterally spaced pins.

9. A device, as claimed in claim 6, wherein the ends of said spring are normally in position to be gripped between the thumb and finger to deflect said spring away from the brush member.

10. A device, as claimed in claim 6, wherein said U-shaped bearing comprises a depression stamped in said strip.

11. In a generator brush holder, a supporting pin extending inwardly from one end of the generator in position over the generator commutator, a strip of sheet metal having a brush secured to one end thereof and having a transverse U-shaped bearing therein adjacent to its other end, said bearing being adapted to fit down over the side of said supporting pin and said strip having a longitudinal slot extending from said other end through said bearing, an anchor pin laterally spaced from the supporting pin and a coil spring disposed around said supporting pin and within said slot having one end anchored against the anchor pin and the other end bearing against the sheet metal strip at the end of said slot, whereby said brush will be resiliently urged to its operative position and whereby upon deflecting the adjacent end of said spring away from said strip, said strip and brush may be withdrawn laterally from said supporting pin.

LEONARD S. WILLIAMS.